Patented May 1, 1951

2,550,682

UNITED STATES PATENT OFFICE 2,550,682

COATING COMPOSITIONS

Lee Bert Falkenburg, Decatur, and Arthur J. Lewis and John C. Cowan, Peoria, Ill., assignors to the United States of America as represented by the Secretary of Agriculture No Drawing. Application April 28, 1950, Serial No. 158,906

2 Claims. (Cl. 106—252)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This application is a continuation-in-part of our copending application for patent Serial No. 624,278, filed October 24, 1945, now abandoned, which is in turn a continuation-in-part of our copending application for patent Serial No. 534,382, filed May 5, 1944, now abandoned.

This invention relates to protective coating compositions particularly useful for protecting the surfaces of metals, such as steel and iron from rusting.

We have found that polyamides formed by the reaction of polymeric fat acids with an excess of a polyamine, particularly ethylene diamine, thus to form a basic polyamide, have increased durability to an unusual extent when used as the essential film-forming ingredient of a coating composition, over similar polyamides formed without use of the excess of the polyamine.

The polymeric fat acids can be prepared from vegetable oils, such as soybean, linseed, and cottonseed oils, which contain substantial amounts of polyunsaturated fat acid radicals in their glycerides. The polymeric fat acids are primarily mixtures of dibasic and tribasic acids with molecular weights of approximately 560 and 840.

In general, according to the invention, the polyamides are prepared by reacting the polymeric fat acids, or a suitable ester thereof, with an excess of the polyamine in a manner suitable to incorporate an excess of the amine in the polyamide, thus to produce a basic polyamide having an amine equivalent of 1500 to 2000 depending on the excess of polyamine. If polymeric fat acids are used, no unusual precautions are necessary, but if the esters are used with a volatile diamine, a fractionating column, which will permit removal of volatile reaction products without the loss of the diamine, may be required.

Example I illustrates the preparation of a polyamide with a plurality of amine groups therein, and Example II that of a polyamide which has approximately the same number of carboxyl or amine groups.

EXAMPLE I 1050 grams of polymeric fat acids (3.46 equivalents, neutral equivalent of acids was 303) was mixed with 186.1 grams of 70 percent ethylene diamine (4.29 equivalents, neutral equivalent of amine solution was 42.9) and slowly heated to 100° C. After five hours at 100–110° C., the temperature was gradually raised to 200° C. in an additional four hours. After one hour at 200° C., the heating was discontinued, and the polyamide poured onto a stone table top which had been previously sprinkled with lumps of Dry Ice. This polyamide had an amine equivalent of 1500 and an acid equivalent of 7800 which were determined by titration with standard acid and alkali. The polyamide of this example is soluble in isopropanol, butanol, secondary butanol, isobutanol, amyl alcohol and in mixtures of these alcohols with the petroleum hydrocarbons. A spray solution of this polyamide was prepared with a mixed solvent of equal volumes of isopropyl alcohol and naphtha. The solution was prepared with 30 percent solids content and then thinned to 15 percent solids content with solvents prior to spraying. Three coats of this spray solution were applied to a hot-rolled steel panel and continuously exposed to severe summer weather and to salt water corrosion.

EXAMPLE II 1582 grams of polymeric fat acids derived from soybean oil and having a neutral equivalent of 295.2 were heated to 150° C., and 230 grams of 70 percent aqueous ethylene diamine added slowly. After two hours, all the diamine was added, and the temperature was raised to 170° C. Then, over a period of 90 minutes, the pressure on the reaction was slowly reduced to 13 mm. of mercury, and the temperature raised to 200° C. The charge was held at 200° C. and 13 mm. pressure for 10 minutes, and then poured into a bucket under an atmosphere of carbon dioxide. The amine equivalent of the polyamide was 7400, and the acid equivalent was 4100. Panels coated with this material similar to that of Example I, using four coats, were also subjected to weathering and salt water frozen tests. The superiority of the basic polyamides of Example I as protective coatings for steel is demonstrated by the major differences as compared to those of Example II in the durability and corrosion resistance between the polyamide coatings which were used on the steel panels, the results of the tests being shown in Table 1.

These polyamides may be combined with pigments, and with certain other compatible resins, if desired, and are dissolved in suitable solvents to form liquid coating compositions. Suitable solvents for coating compositions are the aliphatic or cycloaliphatic alcohols. These alcohols may be used in admixture with aromatic or petroleum hydrocarbons for the purpose of minimizing the cost. The compositions thus formed can be used for spray, for brush, or for dip coating of objects which need protection from corrosion, weathering, or rusting.

TABLE 1

*Outdoor weathering of unpigmented Norelac on hot-rolled steel panels*

| Time of summer exposure in days | Condition of film and panel ||
|---|---|---|
| | Material of Example I (3 coats) | Material of Example II (4 coats) |
| 30 | Good condition | Good condition. |
| 45 | do | Light rust at edges. |
| 60 | do | |
| 75 | Good condition; film adhering to panel. | |
| 90 | Light rust at edges | |

Table 2 shows the superiority of the basic polyamides of Example I over a substantially neutral polyamide in salt water tests. The corrosion tests were performed by dipping the coated steel plates in salt water for 15 seconds and then exposing to the air for 1¾ minutes. A Ferris-wheel arrangement was used for the exposure tests. In these tests, panels were coated by spraying with a 15 percent solids solution of the polyamide resin.

TABLE 2

*Salt water corrosion tests of polyamide films on steel panels*

| Hours of exposure | Material of Example I (3 coats) | Material of Example II (3 coats) |
|---|---|---|
| 50 | Good condition | Good condition. |
| 80 | do | Light rust on edges. |
| 175 | do | |
| 200 | do | |
| 300 | Light rust on edges | |

We claim:

1. A liquid coating composition comprising an alcohol solvent and a basic polyamide as the essential film-forming ingredient dissolved in the solvent, said polyamide being the reaction product of polymeric fat acids and an excess of ethylene diamine and having an amine equivalent of 1500 to 2000.

2. A process of producing a coating composition comprising reacting a member selected from the group of polyamine fat acids and esters of polyamine fat acids with an excess of ethylene diamine to produce a basic polyamide having an amine equivalent of 1500 to 2000, and dissolving the polyamide in an alcohol solvent to form a liquid coating composition having the polyamide as its essential film-forming ingredient.

LEE BERT FALKENBURG.
ARTHUR J. LEWIS.
JOHN C. COWAN.

REFERENCES CITED

The following references are of record in the file of this patent:

UNITED STATES PATENTS

| Number | Name | Date |
|---|---|---|
| 2,379,413 | Bradley | July 3, 1945 |